United States Patent
Akifusa et al.

(10) Patent No.: US 12,059,623 B2
(45) Date of Patent: Aug. 13, 2024

(54) INFORMATION-PROCESSING SYSTEM FOR PLAYING COLOR-RELATED GAME, AND COUNTERPART INFORMATION-PROCESSING DEVICE, STORAGE MEDIUM, AND INFORMATION-PROCESSING METHOD

(71) Applicant: NINTENDO CO., LTD., Kyoto (JP)

(72) Inventors: Yusuke Akifusa, Kyoto (JP); Ikki Niwa, Kyoto (JP); Yuya Kumagai, Tokyo (JP); Susumu Kuribayashi, Tokyo (JP); Hirotaka Uchida, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 147 days.

(21) Appl. No.: 17/591,874

(22) Filed: Feb. 3, 2022

(65) Prior Publication Data
US 2023/0241509 A1 Aug. 3, 2023

(51) Int. Cl.
| | |
|---|---|
| A63F 13/655 | (2014.01) |
| A63F 13/213 | (2014.01) |
| A63F 13/46 | (2014.01) |
| A63F 13/5375 | (2014.01) |
| A63F 13/80 | (2014.01) |

(52) U.S. Cl.
CPC .......... *A63F 13/655* (2014.09); *A63F 13/213* (2014.09); *A63F 13/46* (2014.09); *A63F 13/5375* (2014.09); *A63F 13/80* (2014.09)

(58) Field of Classification Search
None
See application file for complete search history.

(56) References Cited

U.S. PATENT DOCUMENTS

2013/0050192 A1* 2/2013 Kira .................... G06F 16/5854
345/419

FOREIGN PATENT DOCUMENTS

JP 2013-111201 6/2013

* cited by examiner

*Primary Examiner* — Robert T Clarke, Jr.
(74) *Attorney, Agent, or Firm* — Nixon & Vanderhye PC

(57) ABSTRACT

In a first scene of a game played by users, an information-processing system outputs a first image or a first sound to an output device, the first image or the first sound instructing the users to shoot an image by use of a camera device. Subsequently, the information-processing system acquires color information of second images shot by the users, the color information being calculated based on the second shot images, and determines a designated color based on the color information. After determining a designated color, in a second scene subsequent to the first scene, the information-processing system outputs a third image or a second sound to the output device, the third image or the second sound instructing the users to shoot an image of an object that corresponds to the designated color. Subsequently, the information-processing system provides an evaluation to a fourth image shot in the second scene such that the closer a color of the fourth shot image to the designated color, the higher the evaluation.

19 Claims, 8 Drawing Sheets

INFORMATION-PROCESSING SYSTEM FOR PLAYING COLOR-RELATED GAME, AND COUNTERPART INFORMATION-PROCESSING DEVICE, STORAGE MEDIUM, AND INFORMATION-PROCESSING METHOD

FIELD

An embodiment of the present invention relates to a game in which an image captured by a camera is used.

BACKGROUND AND SUMMARY

There is known in the art a game in which an image captured by a camera is used.

An information-processing system according to an embodiment of the present inventio comprises: a processor and a memory coupled thereto, the processor being configured to control the information-processing system to at least: in a first scene of a game played by users, output a first image or a first sound to an output device, the first image or the first sound instructing the users to shoot an image by use of a camera device; acquire color information of second images shot by the users, the color information being calculated based on the second shot images; determine a designated color based on the color information; in a second scene subsequent to the first scene, output a third image or a second sound to the output device, the third image or the second sound instructing the users to shoot an image of an object that corresponds to the designated color; and provide an evaluation to a fourth image shot in the second scene such that the closer a color of the fourth shot image to the designated color, the higher the evaluation.

DETAILED DESCRIPTION OF NON-LIMITING EXAMPLE EMBODIMENTS

1. Embodiment

1-1. Configuration

An information-processing system according to an embodiment of the present invention will be described with reference to the drawings.

Figure 1:
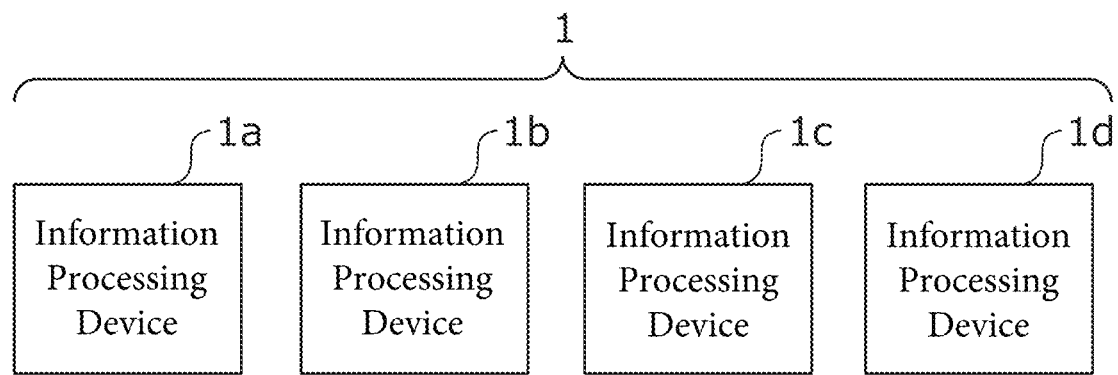
FIG. 1 is a diagram showing an example of an information-processing system.

FIG. 1 is a diagram showing an example of the information-processing system. As shown in the figure, the information-processing system includes information processing devices 1a, 1b, 1c, and 1d (hereinafter, sometimes collectively referred to as "information processing device 1").

The information-processing system is a system for allowing users of information processing device 1 to play a game, which is specifically a game in which players compete to shoot a designated color. In this game, information processing device 1a carries out main processing, and sends and receives information by communication with information processing devices 1b, 1c, and 1d. Information processing device 1a initially determines a designated color, and causes display 16 of information processing device 1 to display the designated color. Users of information processing device 1, by referring to the displayed designated color, try to find a color similar to the designated color around them. When a user finds a similar color around him/her, s/he shoots the color using camera 20 of information processing device 1. Information processing device 1 generates a captured image and analyzes it to generate color-difference data that indicates a difference between a color of the captured image and the designated color. Subsequently, information processing device 1 calculates a score based on the color-difference data. In the calculation, a calculated score becomes higher as a color difference becomes smaller. After calculating the score, information processing device 1 sends score data indicative of the score to information processing device 1a. It is of note that information processing device 1a collectively processes data generated based on an image shot by information processing device 1a and data generated based on images shot by information processing devices 1b, 1c, and 1d in the same manner. In this game, users of information processing devices 1a, 1b, 1c, and 1d are close to each other in a real space. Information processing devices 1a, 1b, 1c, and 1d send data to and receive data from each other by, for example, local wireless communication.

A round of the color find game consists of a tutorial and three actual matches. Of these, the tutorial is a game mode that is played by users to learn how to play the game. In this tutorial, a predetermined designated color is initially displayed on display 16 of each information processing device 1. Users of information processing device 1, by referring to the displayed designated color, try to shoot a color similar to the designated color around them. When a user shoots a similar color, his/her information processing device 1 analyzes a captured image to generate color-difference data that indicates a difference between a color of the captured image and the designated color. Subsequently, the information processing device 1 calculates a score based on the color-difference data, and sends score data indicative of the score to information processing device 1a. It is of note that the score calculated by information processing device 1 here does not affect the actual matches that follow the tutorial.

In the tutorial, information processing device 1 captures an image in response to a user's operation, and also automatically captures an image at predetermined intervals. The images captured at predetermined intervals here represent a surrounding area of a user of information processing device 1. Information processing device 1 analyzes a set of captured images to generate a histogram of colors that exist in the surrounding area of the user. Subsequently, information processing device 1 sends data indicative of the histogram to information processing device 1a. Information processing device 1a, on receiving the data, determines designated colors for use in the actual matches based on the received data. In other words, information processing device 1a determines designated colors for use in the actual matches based on a frequency distribution of colors that exists in the surrounding area of the user.

The tutorial is followed by three actual matches. In each of the three actual matches, one of the determined designated colors is displayed on display 16 of each information processing device 1. Users of information processing device 1, by referring to the displayed designated color, try to shoot a color around them similar to the designated color. When a user shoots a similar color, his/her information processing device 1 analyzes a captured image to generate color-difference data that indicates a difference between a color of the captured image and the designated color. Subsequently, the information processing device 1 calculates a score based on the color-difference data, and sends score data indicative of the score to information processing device 1a.

The round of the color find game is played as a team game, in which a team wins the game when the team obtains a highest total score as a result of the three actual matches.

Hereinafter, the devices constituting the information-processing system will be described.

Figure 2:
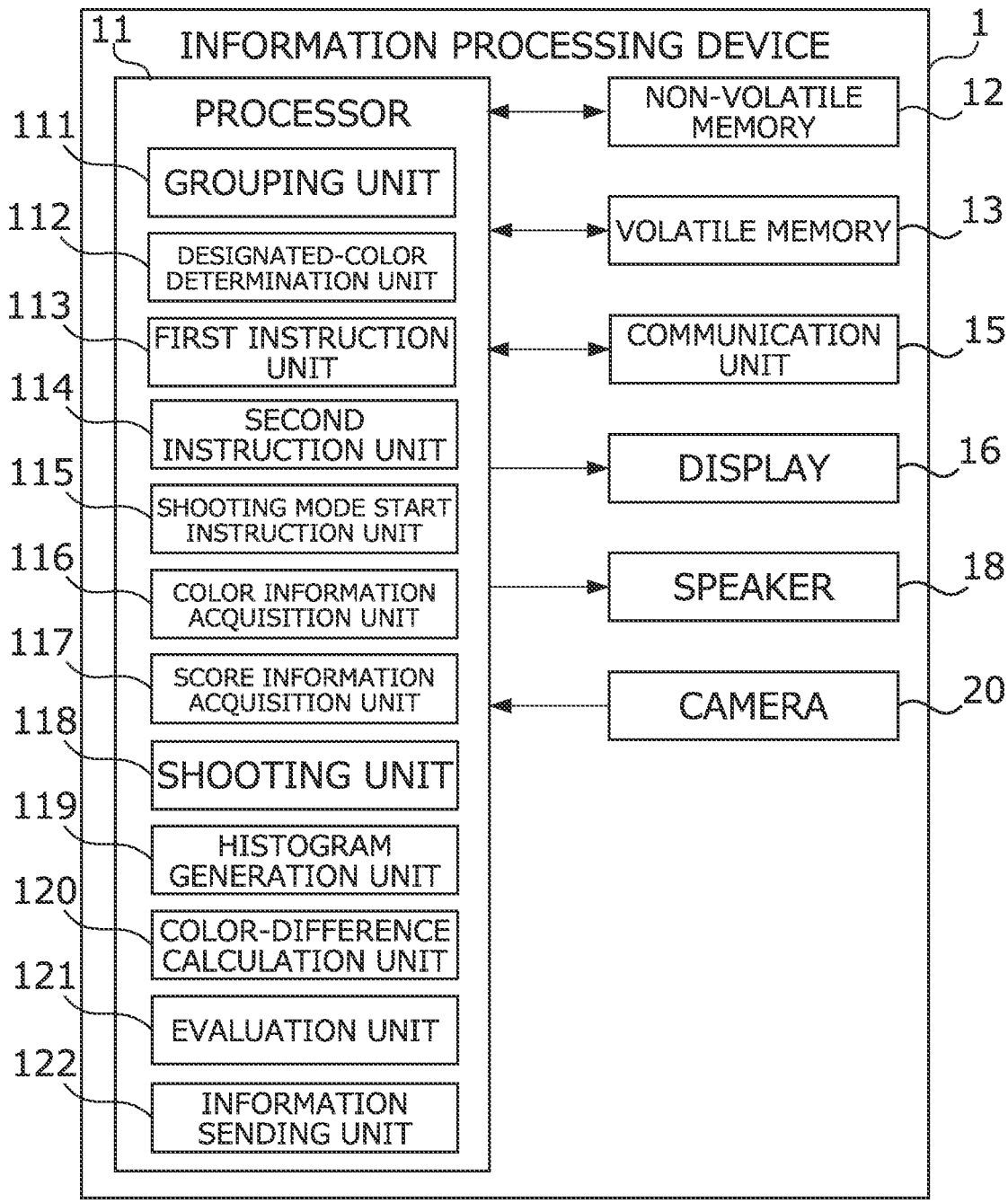
FIG. 2 is a block diagram showing an example of information processing device 1.

FIG. 2 is a block diagram showing an example of information processing device 1. As shown in the figure, information processing device 1 includes processor 11 such as a CPU, non-volatile memory 12 such as a flash memory, volatile memory 13 such as a DRAM, communication unit 15 for enabling communication via communication line, display 16 such as a liquid crystal display, speaker 18, and camera 20.

Figure 3:
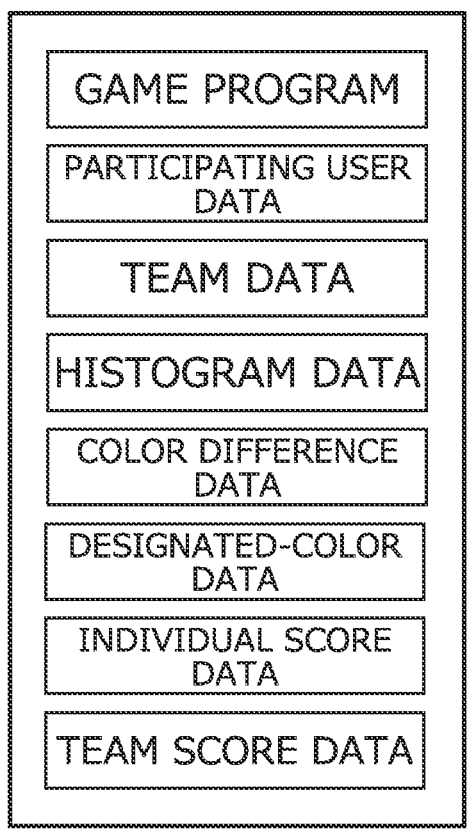
FIG. 3 is a diagram showing an example of a memory map of volatile memory 13.

FIG. 3 is a diagram showing an example of a memory map of volatile memory 13 included in information processing device 1. As shown in the figure, volatile memory 13 can store a game program that is retrieved from non-volatile memory 12 or an external storage medium. The game program is an information-processing program for allowing users of information processing device 1 to play a color find game. This game program is a program that can be distributed via a network such as the Internet or a non-transitory storage medium. Volatile memory 13 also can store participating user data, team data, histogram data, color-difference data, designated-color data, individual score data, and team score data. Hereinafter, those items of data to be stored in volatile memory 13 will be described.

Participating user data is ID data of users who are participating in a color find game.

Team data is data indicating members of each of teams. Specifically, team data consists of sets of a team ID and user IDs of team members for each team.

Histogram data is data indicating histograms, each of which represents a frequency distribution of colors that exist around a participating user.

Color-difference data is data indicating color differences, each of which is a difference between a color of an image taken by a participating user and a designated color. Specifically, the color-difference data consists of sets of a user ID and a color difference calculated in a tutorial for each participating user.

Designated-color data is data indicating designated colors for use in three actual matches. The designated colors indicated by this designated-color data include a first designated color for use in a first actual match, a second designated color for use in a second actual match, and a third designated color for use in a third actual match.

Individual score data is data indicating scores participating users. Specifically, the individual score data consists of sets of a user ID and scores of three actual matches for each participating user.

Team score data is data indicating scores of teams. Specifically, the team score data consists of sets of a team ID and scores of three actual matches for each team.

The above-mentioned game program is loaded into volatile memory 13 and is executed by processor 11. As a result, functions of grouping unit 111, designated-color determination unit 112, first instruction unit 113, second instruction unit 114, shooting mode start instruction unit 115, color information acquisition unit 116, and score information acquisition unit 117, shooting unit 118, histogram generation unit 119, color-difference calculation unit 120, evaluation unit 121, and information sending unit 122 are provided, as shown in FIG. 2.

Grouping unit 111 is configured to divide participating users into two teams such that at least one of the two teams includes two or more users. Grouping unit 111 may perform the division in accordance with an instruction of a user of information processing device 1a, or may perform the division automatically.

In the present embodiment it is assumed that a color find game is played as a team game; however, this style of play is merely an example. As another style of play, a color find game may be played as a one-on-one battle.

Designated-color determination unit 112 is configured to determine designated colors for use in a tutorial and three actual matches.

First instruction unit 113 is configured to cause display 16 to display a shooting instruction screen in a tutorial scene, which screen is for instructing users to shoot a color similar to a designated color that is determined by designated-color determination unit 112.

Second instruction unit 114 is configured to cause display 16 to display a shooting instruction screen in an actual match, which screen is for instructing users to shoot a color similar to a designated color that is determined by designated-color determination unit 112.

Shooting mode start instruction unit 115 is configured to instruct each information processing device 1 to start a shooting mode.

Color information acquisition unit 116 is configured to acquire color information sent from each information processing device 1. The color information acquired by color information acquisition unit 116 refers, specifically, to histogram data.

Score information acquisition unit 117 is configured to acquire score data sent from each information processing device 1.

Shooting unit 118 is configured to cause camera 20 to capture an image of a subject.

Histogram generation unit 119 is configured to generate a histogram based on images captured by shooting unit 118. A histogram generated by histogram generation unit 119 represents a frequency distribution of colors that exist around a user of information processing device 1.

Color-difference calculation unit 120 is configured to calculate a color difference between an image captured by shooting unit 118 and a designated color notified from information processing device 1a.

Evaluation unit 121 is configured to calculate a score based on a color difference that is calculated by color-difference calculation unit 120. In the calculation, a score calculated by evaluation unit 121 becomes higher as a color difference becomes smaller. In other words, a score calculated by evaluation unit 121 becomes higher as a color of an image taken by a participating user becomes closer to a designated color.

Information sending unit 122 is configured to send, to information processing device 1a, data on a histogram that is generated by histogram generation unit 119, and data on a score that is calculated by evaluation unit 121.

The foregoing is a description of information processing device 1.

1-2. Operation

Game processing that is performed by information processing device 1a will be described with reference to FIG. 4, which is a flowchart showing an example of the game processing.

The game processing shown in the figure is processing for enabling users of information processing device 1 to play a round of a color find game, which consists of a tutorial and three actual matches. Hereinafter, each step of the game processing will be described.

Figure 5:
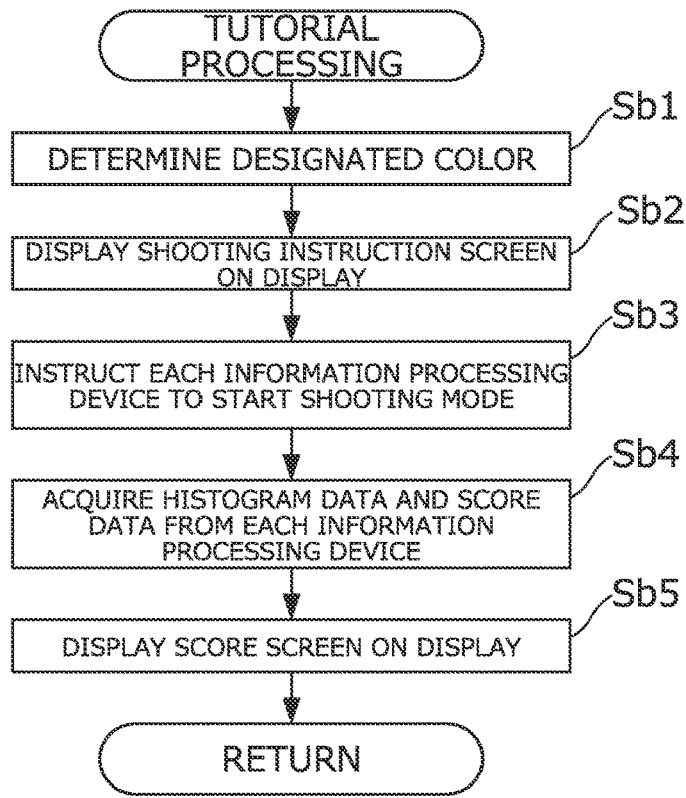
FIG. 5 is a flowchart showing an example of tutorial processing.

In the game processing, grouping unit 111 initially divides participating users into two teams (step Sa1). Grouping unit 111 may perform the division in accordance with an instruction of a user of information processing device 1a, or may perform the division automatically. After grouping unit 111 performs the division, tutorial processing is carried out (step Sa2) to let the users learn how to play a color find game. FIG. 5 is a flow chart showing an example of the tutorial processing.

In the tutorial processing shown in the figure, designated-color determination unit 112 initially determines a designated color (step Sb1). When doing so, designated-color determination unit 112 selects a color from among predetermined eight colors by use of a randomized algorithm. After designated-color determination unit 112 determines the designated color, first instruction unit 113 causes display 16 to display a shooting instruction screen, which instructs the users to shoot a color similar to the determined designated color (step Sb2). In an example, the shooting instruction screen shows a rectangle depicted in the designated color, and a text that instructs the users to shoot the designated color.

After the shooting instruction screen is displayed, shooting mode start instruction unit 115 sends a shooting mode start instruction to each information processing device 1 (step Sb3). The shooting mode start instruction includes data indicative of the designated color determined at step Sb1.

Figure 6:
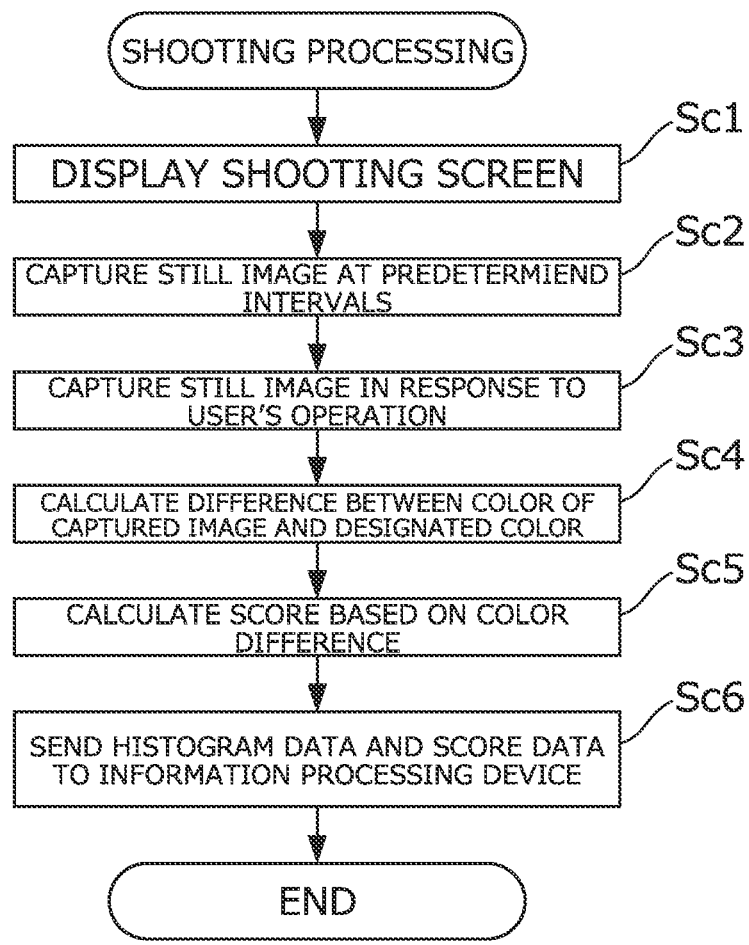
FIG. 6 is a flowchart showing an example of shooting processing.

When information processing device 1 receives the shooting mode start instruction, information processing device 1 carries out shooting processing. FIG. 6 is a flowchart showing an example of the shooting processing.

In the shooting processing shown in the figure, shooting unit 118 initially activates camera 20 and causes display 16 to display a shooting screen (step Sc1). The shooting screen includes a moving image that is captured by camera 20, and circle that is arranged in the center of the image and is colored in the designated color. A user of information processing device 1, by referring to the shooting screen, tries to find a color that is similar to the designated color around him/her. While the user is looking for a similar color, shooting unit 118 captures a still image of a displayed subject at predetermined intervals (for example, every second) (step Sc2). Shooting unit 118 performs the periodic capturing of a still image regardless of the user's operations. Shooting unit 118 continues the periodic capturing of a still image until the user presses a shutter button. Still images captured by shooting unit 118 here represent a surrounding of the user.

Histogram generation unit 119 generates a histogram based on the images captured at step Sc2. To generate a histogram, histogram generation unit 119 carries out first processing and second processing each time a still image is captured. In the first processing, histogram generation unit 119 identifies, for each of pixels of a captured image, a most similar color from among 64 predetermined colors. In the second processing, histogram generation unit 119 cumulatively counts, for each of the 64 colors, the number of times the color has been identified as a color most similar to that of a pixel. A histogram generated by histogram generation unit 119 here represents a frequency distribution of colors that exist around the user.

When the user has found a color similar to the designated color, s/he causes the similar color to appear on the shooting screen and presses a shutter button. In response to the pressing of the shutter button, shooting unit 118 captures a still image of a displayed subject (step Sc3). Color-difference calculation unit 120 calculates a color difference between the captured image and the designated color notified from information processing device 1a (step Sc4). Specifically, color-difference calculation unit 120 initially identifies pixels of the captured image, that are arranged within a circle that is colored in the designated color. Subsequently, color-difference calculation unit 120 calculates, for each of the identified pixels, a color difference from the designated color notified from information processing device 1a, by use of the CIEDE2000 color-difference formula. Finally, color-difference calculation unit 120 calculates an average of calculated color differences. The average calculated by color-difference calculation unit 120 here is treated as a color difference between a color of the captured image and the designated color in the present embodiment.

After color-difference calculation unit 120 calculates the color difference, evaluation unit 121 calculates a score based on the calculated color difference (step Sc5). In the calculation, a score calculated by evaluation unit 121 becomes higher as a color difference becomes smaller.

After evaluation unit 121 calculates the score, information sending unit 122 sends, to information processing device 1a, data on the histogram generated at step Sc4 and data on the score calculated at step Sc5 (step Sc6).

The foregoing is a description of the shooting processing.

Each information processing device 1 carries out the shooting processing to send histogram data and score data to information processing device 1a. Of the sent items of data, the histogram data is acquired by color information acquisition unit 116 of information processing device 1a, and the score data is acquired by score information acquisition unit 117 of information processing device 1a (step Sb4 in FIG. 5). Score information acquisition unit 117, on acquiring the score data, causes display 16 of information processing device 1 to display a score screen that shows scores of the users (step Sb5). By referring to the score screen, each of the users can know their scores.

The foregoing is a description of the tutorial processing.

As a result of execution of the tutorial processing, each user can learn how to play the color find game. In addition, information processing device 1a can acquire, from each user, a histogram that shows a frequency distribution of colors that exist around a user.

Figure 7:
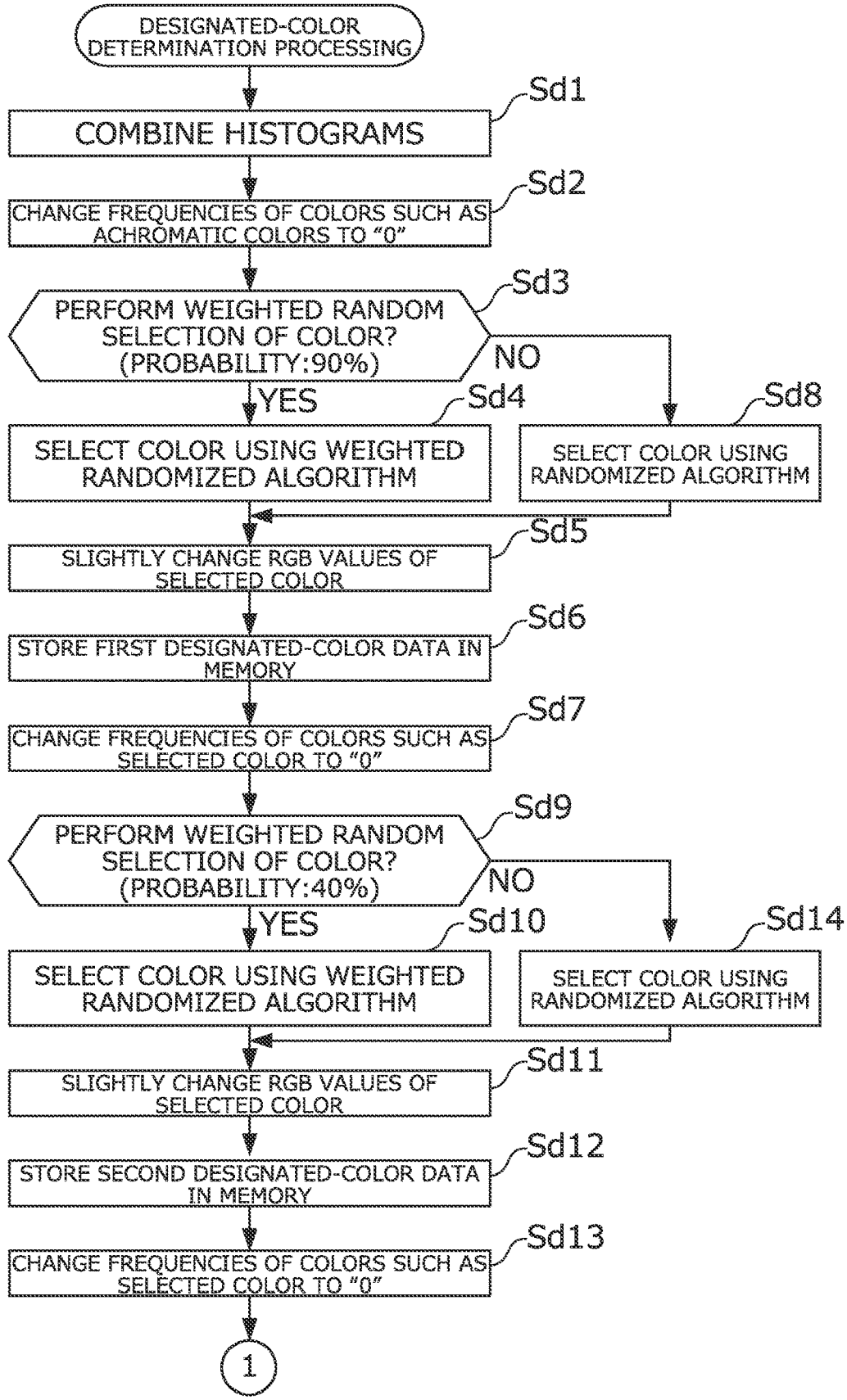
FIG. 7 is a flowchart showing an example of designated-color determination processing.
Figure 8:
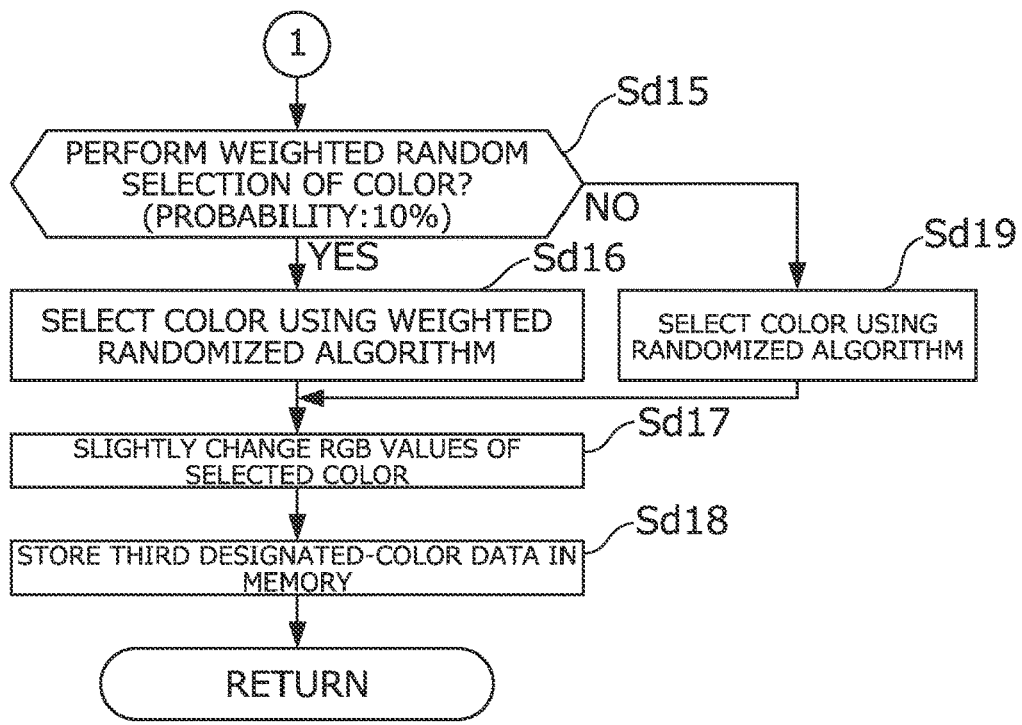
FIG. 8 is a flowchart showing an example of designated-color determination processing.

The tutorial processing is followed by designated-color determination processing (step Sa3 in FIG. 4), which is processing for determining designated colors for use in the three actual matches that follows the tutorial. FIGS. 7 and 8 are flowcharts showing an example of the designated-color determination processing.

In the designated-color determination processing shown in the figure, designated-color determination unit 112 combines histograms notified from information processing device 1 (step Sd1). Specifically, designated-color determination unit 112 adds up frequencies of the histograms on a color basis so that the unit generates a histogram showing a frequency distribution of colors for the entire group of participating users. Designated-color determination unit 112 performs this step to prevent some users from having an advantage in the game. After generating the histogram, designated-color determination unit 112 changes, in the generated histogram, frequencies of achromatic colors and predetermined colors that are unlikely to exist in the natural world, to a value "0" (step Sd2). Designated-color determination unit 112 performs this step to exclude the achromatic colors and the predetermined colors from candidates for designated colors. After updating the histogram, designated-color determination unit 112 determines whether to perform a weighted random selection to select a color from the updated histogram (step Sd3). At this step, designated-color determination unit 112 makes a "YES" determination with a probability of 90 percent. At this step, when designated-color determination unit 112 determines that the unit will perform a weighted random selection (YES at step Sd3), the unit selects a color from the updated histogram by use of a weighted randomized algorithm (step Sd4). When selecting a color, designated-color determination unit 112 selects a color having a higher frequency with a higher selection probability. After selecting a color, designated-color determination unit 112 slightly changes RGB values of the selected color (step Sd5). Designated-color determination unit 112 performs this step to increase variations of a designated color. After changing the RGB values, designated-color determination unit 112 stores data on the slightly changed color in volatile memory 13 as data representing a first designated color (step Sd6). After storing the first designated color data, designated-color determination unit 112 changes, in the updated histogram, frequencies of the selected color and colors similar to the color to a value "0" (step Sd7). Designated-color determination unit 112 performs this step to exclude the selected color and the similar colors from candidates for a second designated color and a third designated color.

At step Sd3 described above, when designated-color determination unit 112 does not determine that the unit will perform a weighted random selection (NO at step Sd3), the unit selects a color from the updated histogram by use of a randomized algorithm (step Sd8). Subsequently, designated-color determination unit 112 performs steps Sd5 to Sd7 described above relative to the selected color.

After determining the first designated color, designated-color determination unit 112 determines whether to perform a weighted random selection to select a color from the histogram updated at step Sd7 (step Sd9). At this step, designated-color determination unit 112 makes a "YES" determination with a probability of 40 percent. At this step, when designated-color determination unit 112 determines that the unit will perform a weighted random selection (YES at step Sd9), the unit selects a color from the updated histogram by use of a weighted randomized algorithm (step Sd10). When selecting a color, designated-color determination unit 112 selects a color having a higher frequency with a higher selection probability. After selecting a color, designated-color determination unit 112 slightly changes RGB values of the selected color (step Sd11). After changing the RGB values, designated-color determination unit 112 stores data on the slightly changed color in volatile memory 13 as data representing a second designated color (step Sd12). After storing the second designated color data, designated-color determination unit 112 changes, in the updated histogram, frequencies of the selected color and colors similar to the color to a value "0" (step Sd13).

At step Sd9 described above, when designated-color determination unit 112 does not determine that the unit will perform a weighted random selection (NO at step Sd9), the unit selects a color from the updated histogram by use of a randomized algorithm (step Sd14). Subsequently, designated-color determination unit 112 performs steps Sd11 to Sd13 described above relative to the selected color.

After determining the second designated color, designated-color determination unit 112 determines whether to perform a weighted random selection to select a color from the histogram updated at step Sd13 (step Sd15). At this step, designated-color determination unit 112 makes a "YES" determination with a probability of 10 percent. At this step, when designated-color determination unit 112 determines that the unit will perform a weighted random selection (YES at step Sd15), the unit selects a color from the updated histogram by use of a weighted randomized algorithm (step Sd16). When selecting a color, designated-color determination unit 112 selects a color having a higher frequency with a higher selection probability. After selecting a color, designated-color determination unit 112 slightly changes RGB values of the selected color (step Sd17). After changing the RGB values, designated-color determination unit 112 stores data on the slightly changed color in volatile memory 13 as data representing a third designated color (step Sd18).

At step Sd15 described above, when designated-color determination unit 112 does not determine that the unit will perform a weighted random selection (NO at step Sd15), the unit selects a color from the updated histogram by use of a randomized algorithm (step Sd19). Subsequently, designated-color determination unit 112 performs steps Sd17 and Sd18 described above relative to the selected color.

The foregoing is a description of the designated-color determination processing.

As a result of execution of the designated-color determination processing, designated colors for use in the actual matches are determined. In the determination, the designated colors are selected from a histogram that shows a frequency distribution of colors that exist around users. In addition, the designated colors may be selected using a weighted randomized algorithm. Accordingly, colors that are likely to exist around the users can be selected as the designated colors.

In the designated-color determination processing, as actual matches advance, a probability that a weighted randomized algorithm is used decreases. This decrease in probability of use of a weighted randomized algorithm means that a probability that a color that is likely to exist around users or a color similar to the color is selected as a designated color decreases. Therefore, as a result of the designated-color determination processing, as actual matches advance, a difficulty level of the game increases.

Figure 4:
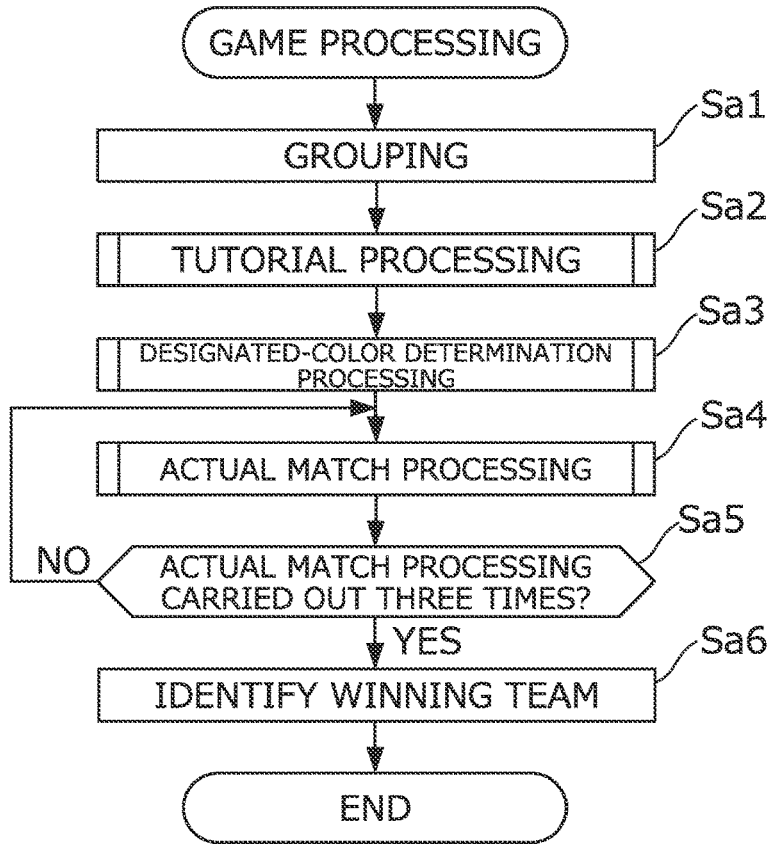
FIG. 4 is a flowchart showing an example of game processing.
Figure 9:
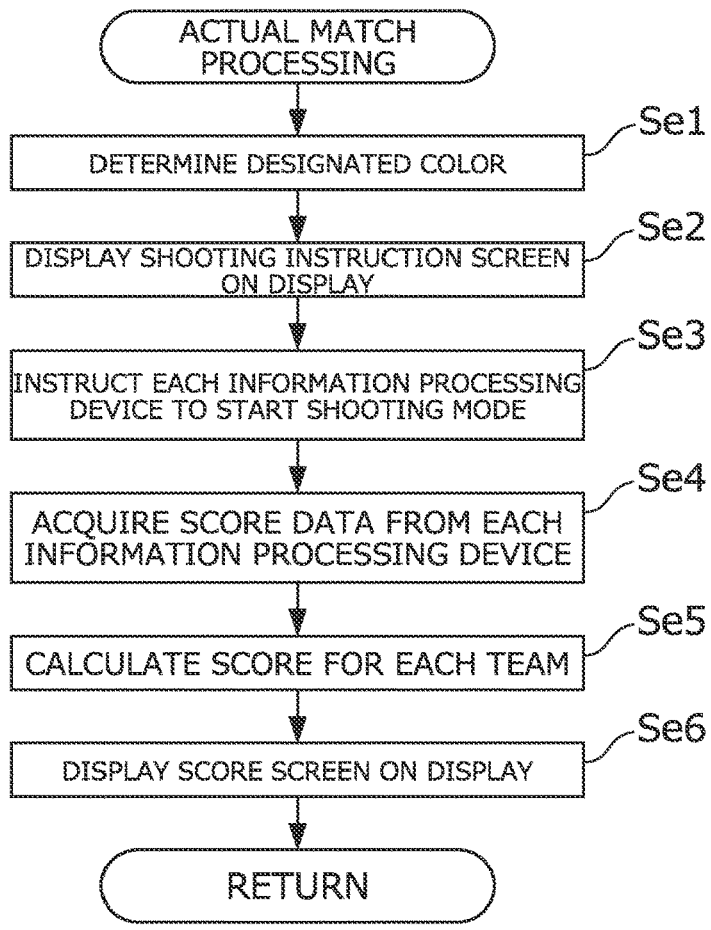
FIG. 9 is a flowchart showing an example of actual-match processing.

The designated-color determination processing is followed by actual-match processing (step Sa4 in FIG. 4). FIG. 9 is a flowchart showing an example of the actual-match processing.

In the actual-match processing shown in the figure, designated-color determination unit 112 initially identifies a designated color in accordance with the number of times the actual-match processing has been executed (step Se1). Specifically, designated-color determination unit 112 identifies a first designated color for a first actual match, identifies a second designated color for a second actual match, and identifies a third designated color for a third actual match. After designated-color determination unit 112 identifies a designated color, second instruction unit 114 causes display 16 to display a shooting instruction screen that instructs users to shoot a color that is similar to the identified designated color (step Se2). An example of the shooting instruction screen is as described above. By referring to the shooting instruction screen, the users can know the designated color.

After the shooting instruction screen is displayed, shooting mode start instruction unit 115 sends a shooting mode start instruction to each information processing device 1 (step Se3). The shooting mode start instruction includes data indicative of the designated color determined at step Se1.

Figure 10:
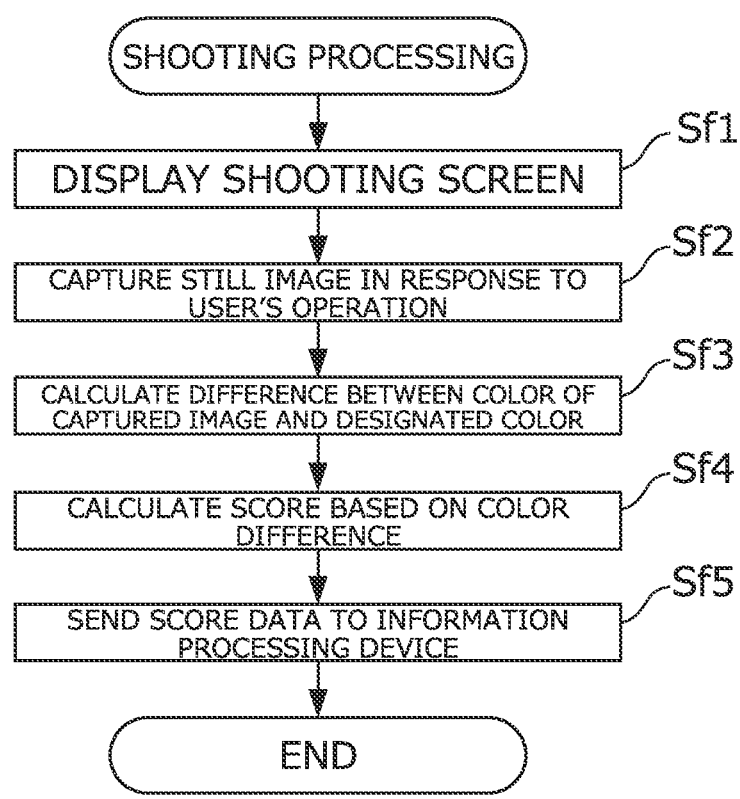
FIG. 10 is a flowchart showing an example of shooting processing.

When information processing device 1 receives the shooting mode start instruction, information processing device 1 carries out shooting processing. FIG. 10 is a flowchart showing an example of the shooting processing.

In the shooting processing shown in the figure, shooting unit 118 initially activates camera 20 and causes display 16 to display a shooting screen (step Sf1), an example of which is as described above. A user of information processing device 1, by referring to the shooting screen, tries to find a color that is similar to the designated color around him/her. When the user has found a color similar to the designated color, s/he causes the similar color to appear on the shooting screen and presses a shutter button. In response to the pressing of the shutter button, shooting unit 118 captures a still image of a displayed subject (step Sf2).

After shooting unit 118 captures the still image, color-difference calculation unit 120 calculates a color difference between the captured image and the designated color notified from information processing device 1a (step Sf3). Specifically, color-difference calculation unit 120 initially identifies pixels of the captured image, that are arranged within a circle that is colored in the designated color. Subsequently, color-difference calculation unit 120 calculates, for each of the identified pixels, a color difference from the designated color notified from information processing device 1a, by use of the CIEDE2000 color-difference formula. Finally, color-difference calculation unit 120 calculates an average of calculated color differences. The average calculated by color-difference calculation unit 120 here is treated as a color difference between a color of the captured image and the designated color in the present embodiment.

After color-difference calculation unit 120 calculates the color difference, evaluation unit 121 calculates a score based on the calculated color difference (step Sf4). In the calculation, a calculated score become higher as a color difference becomes smaller.

After evaluation unit 121 calculates the score, information sending unit 122 sends data on the calculated score to information processing device 1a (step Sf5).

The foregoing is a description of the shooting processing.

Each information processing device 1 carries out the shooting processing to send score data to information processing device 1a. Score information acquisition unit 117 of information processing device 1a acquires the sent score data (step Se4 in FIG. 9), and stores it in volatile memory 13 in association with a user ID of a source of the score data. After storing score data for each user, score information acquisition unit 117 calculates a score for each team (step Se5), and stores data on a calculated score in volatile memory 13 in association with a team ID. After calculating a score for each team, score information acquisition unit 117 causes display 16 to display a score screen that shows a calculated score of each user and a calculated score of each team (step Se6). By referring to the score screen, each user can know their scores and their team's total scores.

The foregoing is a description of the real match processing.

When the actual-match processing is carried out three times (YES at step Sa5 in FIG. 4), score information acquisition unit 117 totals scores of three actual matches for each team, and identifies a team having a highest total score as a winning team (step Sa6). Subsequently, score information acquisition unit 117 causes display 16 to display a game result screen showing the winning team. By referring to the game result screen, each user can know the winning team.

The foregoing is a description of the game processing.

2. Modifications

The above embodiment may be modified as described below. The modifications described below may be combined with each other.

2-1. Modification 1

Part or all of the functions of information processing device 1 may be provided by server. In essence, arrangement of the functions of the game processing system may be freely determined by a provider of the system.

2-2. Modification 2

In the above game processing, a color find game is played as a team game; however, this game may be played as an individual game.

2-3. Modification 3

In the above embodiment, a round of color find game includes three actual matches; however, the number of actual matches may be less than or more than three.

2-4. Modification 4

Information processing device 1, in addition to or instead of causing display 16 of information processing device 1 to display a shooting instruction screen, may cause speaker 18 of information processing device 1 to output a voice message that instructs users to shoot a color similar to a designated color.

2-5. Modification 5

At step Sc2 of the shooting processing shown in FIG. 6, information processing device 1 captures a still image at predetermined intervals; however, at this step, information processing device 1 may capture only one still image.

2-6. Modification 6

In the above shooting processing, histogram generation unit 119 generates a histogram based on still images, each of which has been captured at predetermined intervals (see step Sc2 in FIG. 6). However, histogram generation unit 119 may generate a histogram based on, instead of the periodically captured still images, a still image captured in response to a user's pressing of a shutter button (see step Sc3). In that case, step Sc2 of the shooting process may be omitted.

2-7. Modification 7

In the above shooting processing, information processing device 1 (information processing devices 1*a*, 1*b*, 1*c*, and 1*d*) generates a histogram (see step Sc2 in FIG. 6); however, instead of each information processing device 1, only information processing device 1*a* may generate a histogram. In that case, information processing devices 1*b*, 1*c*, and 1*d* may capture a still image in response to user's pressing of a shutter button, and send data on the captured still image to information processing device 1*a* (see step Sc3). Information processing device 1*a*, on receiving the sent data, may generate a histogram based on the data.

2-8. Modification 8

In the above shooting processing, color-difference calculation unit 120 identifies pixels of a captured image, that are arranged within a predetermined center circle, and calculates a color difference based on the identified pixels (see step Sc4 in FIG. 6 and step Sf3 in FIG. 10). However, color-difference calculation unit 120 may identify pixels arranged within a predetermined boundary other than the center circle. Alternatively, color-difference calculation unit 120 may identify a pixel arranged at a predetermined position in a captured image, and calculate a color difference between a color of the pixel and a designated color. The color difference calculated here is treated as a color difference between a color of the captured image and the designated color.

2-9. Modification 9

In the above shooting processing, color-difference calculation unit 120 calculates, for each of pixels of a captured image, a color difference from a designated color, and calculates an average of calculated color differences. The reason that color-difference calculation unit 120 calculates an average of color differences is to ignore differences in resolution between information processing device 1*a*, 1*b*, 1*c*, and 1*d*. However, color-difference calculation unit 120 may calculate a variance or total of color differences, instead of an average of color differences. The variance or total calculated by color-difference calculation unit 120 here is treated as a color difference between a color of a captured image and a designated color.

2-10. Modification 10

In the above designated-color determination processing, designated-color determination unit 112 selects a designated color from a histogram by use of a randomized algorithm (see steps Sd4 and Sd8 in FIG. 7, etc.). When doing so, designated-color determination unit 112 may select a designated color from top 10 colors shown in a histogram by use of a randomized algorithm. By narrowing candidates for a designated color down to top 10 colors, it is possible to lower a difficulty level of a color find game.

In another selection method, designated-color determination unit 112 may select a designated color from bottom 10 colors shown in a histogram by use of a randomized algorithm. By narrowing candidates for a designated color down to bottom 10 colors, it is possible to increase a difficulty level of a color find game.

In yet another selection method, designated-color determination unit 112 may select a designated color from among colors shown in a histogram, whose frequency is equal to or higher than a predetermined threshold value, by use of a randomized algorithm. The colors whose frequency is equal to or higher than a predetermined threshold value here are colors that occupy an area equal to or higher than a predetermined threshold value in an image captured by a user. By narrowing candidates for a designated color down to colors whose frequency is equal to or higher than a threshold value, it is possible to lower a difficulty level of a color find game.

2-11. Modification 11

In the above designated-color determination processing, steps Sd7 and Sd13 are performed, as shown in FIG. 7, so that designated colors for three actual matches do not overlap; however, those steps are not essential. Designated colors for two or more actual matches may overlap.

2-12. Modification 12

In the above game processing, information processing device 1*a* determines designated colors for three actual matches based on histogram data acquired in tutorial processing; however, this method for determining designated colors may be replaced with another method. Information processing device 1*a* may determine a designated color for a second actual match based on histogram data acquired in a first actual match, and determine a designated color for a third actual match based on histogram data acquired in a second actual match. In that case, information processing device 1 generates a histogram in shooting processing for a first actual match and in shooting processing for a second actual match. In addition, information processing device 1*a* performs only steps Sd1 to Sd6 in designated-color determination processing preceding actual match processing for a first actual match, and information processing device 1*a* performs steps Sd1 to Sd6 of designated-color determination processing prior to actual match processing for second and third actual matches.

2-13. Modification 13

The above designated-color determination processing may lack the step of slightly changing RGB values of a color that is selected from a histogram.

2-14. Modification 14

In the above shooting processing, information processing device 1*a* instructs users to shoot a color similar to a designated color (see step Sb2 in FIG. 5 and step Se2 in FIG. 9); however, the instruction provided by information processing device 1*a* is merely an example. In another instruction method, information processing device 1*a* may instruct users to shoot a similar color in a manner in which a designated color is not directly referred to. For example, information processing device 1*a* may provide an instruction message such as "Let's take a photo of an object suggestive of an apple!" In another example, information processing device 1*a* may instruct users to shoot a designated color itself. For example, information processing device 1*a* may provide an instruction message such as "Let's take a photo of a red color."

What is claimed is:
1. An information-processing system, comprising:
a processor and a memory coupled thereto, the processor being configured to control the information-processing system to at least:

in a first scene of a game played by users, output a first prompting image or a first prompting sound, the first prompting image or the first prompting sound instructing the users to acquire a first reference image via a camera;

extract colors of pixels from first acquired images acquired by the users following the instruction to acquire the first reference image;

calculate color information based on a frequency distribution of the extracted colors of pixels;

determine a designated color based on the calculated color information;

in a second scene subsequent to the first scene, output a second prompting image or a second prompting sound, the second prompting image or the second prompting sound instructing the users to acquire a second reference image with an object that corresponds to the designated color;

determine color differences between elements of respective second acquired images acquired by the users during the second scene and the designated color; and generate a display based on the determined color differences.

2. The information-processing system according to claim 1, wherein the processor is further configured to control the information-processing system to at least provide a value for each second acquired image such that the smaller the determined color difference for the respective second acquired image, the higher the value, wherein the color differences are determined at a predetermined position or in a predetermined area of the respective second acquired images.

3. The information-processing system according to claim 1, wherein the processor is further configured to control the information-processing system to at least provide a value for each second acquired image such that the smaller the determined color difference for the respective acquired second image, the higher the value, wherein the color differences are averages of differences between pixels included in a predetermined area of the respective second acquired images and the designated color.

4. The information-processing system according to claim 1, wherein the designated color is a color included in at least one of the first acquired images or a color within a predetermined distance thereof.

5. The information-processing system according to claim 4, wherein the designated color is selected from the colors included the first acquired images with a probability that corresponds to an appearance frequency of the colors in the first acquired images.

6. The information-processing system according to claim 5, wherein the colors in the first acquired images are classified into predetermined color groups, and the designated color is selected from the colors included the first acquired images with a probability that corresponds to an appearance frequency of the color groups.

7. The information-processing system according to claim 1, wherein the designated color is not achromatic.

8. The information-processing system according to claim 1, wherein the first prompting image or the first prompting sound includes an instruction for the users to acquire an image of a reference object that corresponds to a predetermined color.

9. The information-processing system according to claim 8, wherein color differences are determined for each of the second acquired images.

10. The information-processing system according to claim 1, wherein each user is instructed to acquire a set of first acquired images, and the colors of pixels are extracted from the sets of first acquired images.

11. The information-processing system according to claim 10, wherein the sets of first acquired images are acquired at predetermined intervals.

12. The information-processing system according to claim 1, wherein the processor is further configured to control the information-processing system to at least:
set, as a new designated color, a color that is different from, and outside of a predetermined distance of, the designated color; and
in a third scene subsequent to the second scene, determine color differences between elements of respective third acquired images acquired by the users during the third scene and the new designated color.

13. The information-processing system according to claim 1, wherein the second scene is repeated three or more times, the designated color is set for use in each repetition of the second scene, and the designated color that is set for use in a last repetition of the second scene is different from and outside of a predetermined distance of the designated colors set for use in prior repetitions.

14. The information-processing system according to claim 12, wherein the new designated color is set based on the color information calculated based on the second acquired images.

15. The information-processing system according to claim 1, wherein the second prompting image or the second prompting sound instructs all of the users to acquire an image with an object that corresponding identically to the designated color.

16. The information-processing system according to claim 1, wherein the users are within a predetermined distance of each other in a real space.

17. An information-processing device, comprising:
a processor and a memory coupled thereto, the processor being configured to control the information-processing device to at least:
in a first scene of a game played by users, output a first prompting image or a first prompting sound, the first prompting image or the first prompting sound instructing the users to acquire a first reference image via a camera;
extract colors of pixels from first acquired images acquired by the users following the instruction to acquire the first reference image;
calculate color information based on a frequency distribution of the extracted colors of pixels;
determine a designated color based on the calculated color information;
in a second scene subsequent to the first scene, output a second prompting image or a second prompting sound, the second prompting image or the second prompting sound instructing the users to acquire a second reference image with an object that corresponds to the designated color;
determine color differences between elements of respective second acquired images acquired by the users during the second scene and the designated color; and
generate a display based on the determined color differences.

18. A non-transitory computer-readable storage medium having stored therein instructions that, when executed by a processor of an information-processing device, cause the information-processing device to perform operations comprising:
- in a first scene of a game played by users, outputting a first prompting image or a first prompting sound, the first prompting image or the first prompting sound instructing the users to acquire a first reference image via a camera;
- extracting colors of pixels from first acquired images acquired by the users following the instruction to acquire the first reference image;
- calculating color information based on a frequency distribution of the extracted colors of pixels;
- determining a designated color based on the calculated color information;
- in a second scene subsequent to the first scene, outputting a second prompting image or a second prompting sound, the second prompting image or the second prompting sound instructing the users to acquire a second reference image with an object that corresponds to the designated color;
- determining color differences between elements of respective second acquired images acquired by the users during the second scene and the designated color; and
- generating a display based on the determined color differences.

19. An information-processing method executed by an information-processing device, the method comprising:
- in a first scene of a game played by users, outputting a first prompting image or a first prompting sound, the first prompting image or the first prompting sound instructing the users to acquire a first reference image via a camera;
- extracting colors of pixels from first acquired images acquired by the users following the instruction to acquire the first reference image;
- calculating color information based on a frequency distribution of the extracted colors of pixels;
- determining a designated color based on the calculated color information;
- in a second scene subsequent to the first scene, outputting a second prompting image or a second prompting sound, the second prompting image or the second prompting sound instructing the users to acquire a second reference image with an object that corresponds to the designated color;
- determining color differences between elements of respective second acquired images acquired by the users during the second scene and the designated color; and
- generating a display based on the determined color differences.

* * * * *